(No Model.) 3 Sheets—Sheet 1.
P. P. MAST.
CULTIVATOR.
No. 354,717. Patented Dec. 21, 1886.
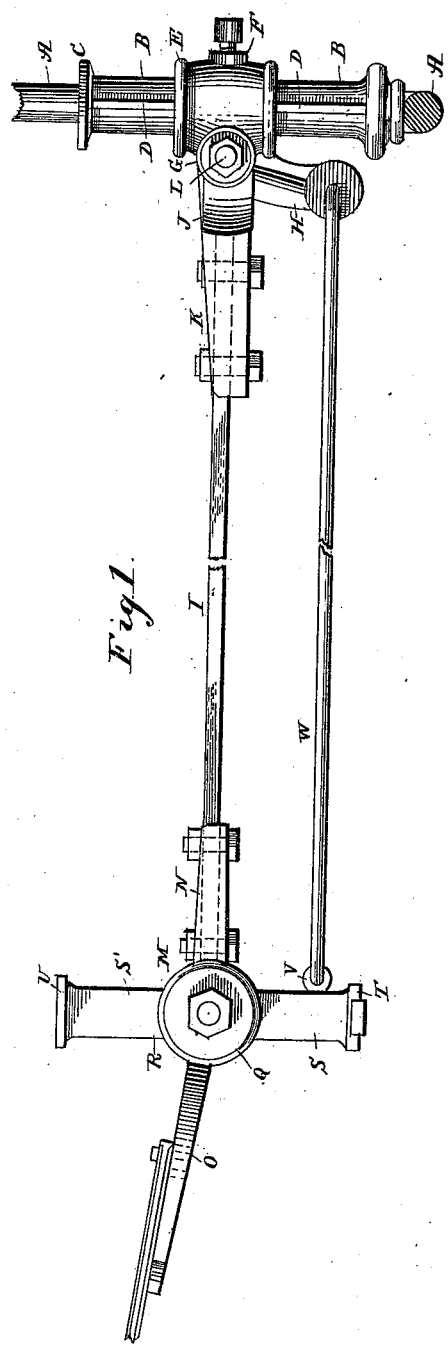
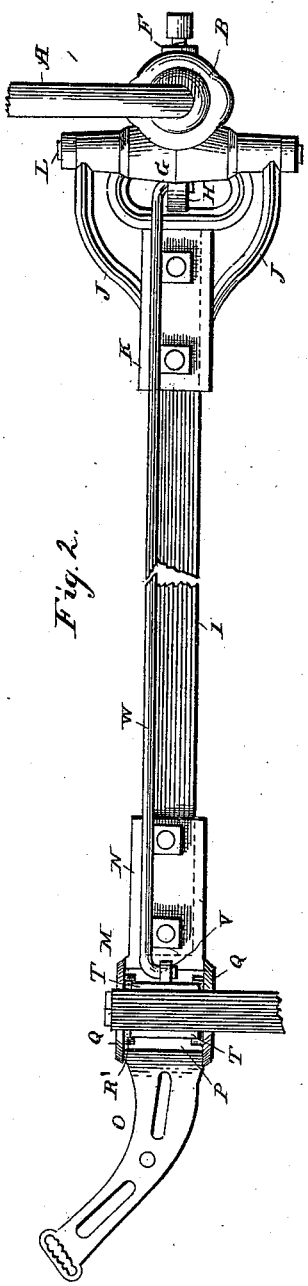
WITNESSES
INVENTOR (No Model.)

3 Sheets—Sheet 2.

P. P. MAST.
CULTIVATOR.

No. 354,717.  Patented Dec. 21, 1886.

WITNESSES
A. A. Eastman
Geo. F. Brott

INVENTOR
Phineas P. Mast
By Toulmin & Jennes
his Attorneys.

(No Model.) 3 Sheets—Sheet 3.
P. P. MAST.
CULTIVATOR.
No. 354,717. Patented Dec. 21, 1886.
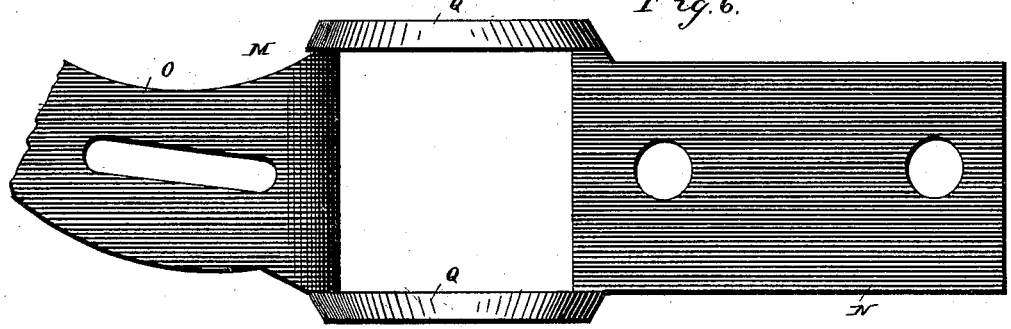
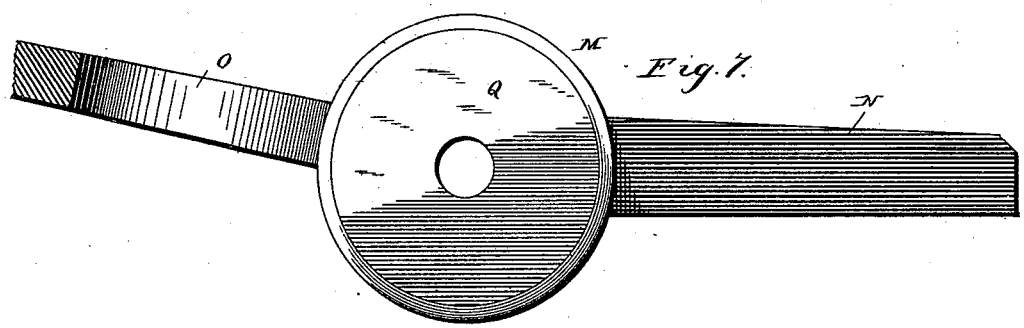
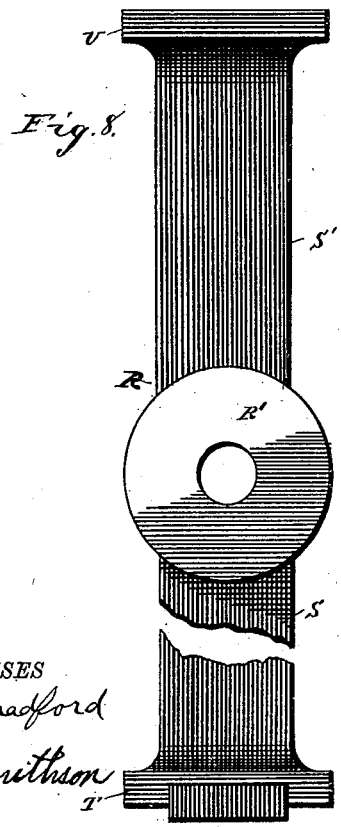
WITNESSES
Edwin L. Bradford
Thomas J. Smithson
INVENTOR
Phineas P. Mast,
By Toulmin & Jennings,
his Attorneys.

UNITED STATES PATENT OFFICE.

PHINEAS P. MAST, OF SPRINGFIELD, OHIO, ASSIGNOR TO P. P. MAST & CO., OF SAME PLACE.

CULTIVATOR.

SPECIFICATION forming part of Letters Patent No. 354,717, dated December 21, 1886.

Application filed October 16, 1886. Serial No. 216,436. (No model.)

*To all whom it may concern:*

Be it known that I, PHINEAS P. MAST, a citizen of the United States, residing at Springfield, in the county of Clark and State of Ohio, have invented certain new and useful Improvements in Cultivators, of which the following is a specification, reference being had therein to the accompanying drawings.

This invention relates to improvements in cultivators, and is of that class in which provision is made for maintaining the alignment or parallelism between the shovels and the axle irrespective of a change in the lateral position of the shovel-beams; and the invention consists, essentially, in the construction of the couplings, by which the beams and alignment-rods are connected with the axle, and in the construction of the beam-brackets and the cross-heads which carry the shovel-standards at the point where those brackets and those standards are connected together. The object in view in the first of these features is the attainment of a free oscillating movement of the couplings on the axle, which admits of the ready elevation and depression of the beams with respect to the ground, and also of the lateral adjustment of that portion of the couplings to which the alignment-rod and the beam are directly connected for the purpose of adjusting the beams laterally with respect to the rows. The object in view in the second of these features is the prevention of the twisting tendencies of the cross-head with respect to the beam, due to the liability of the ends of the cross-head to which the shovels are attached to work up and down.

Figure 3:
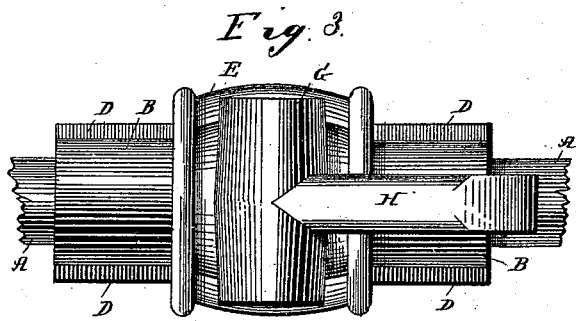
Figure 4:
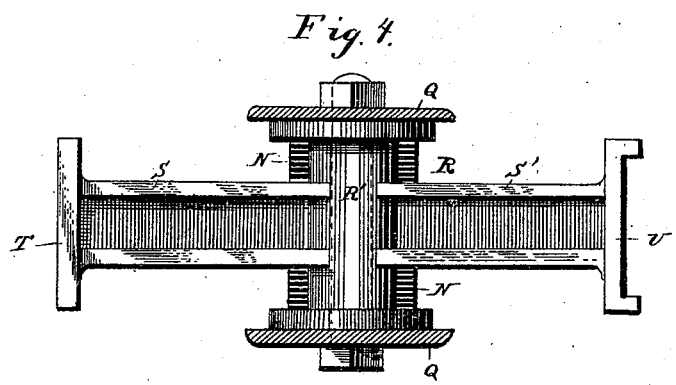
Figure 5:
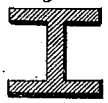

In the accompanying drawings, forming a part of this specification, and on which similar letters of reference indicate the same or corresponding features, Figure 1 represents a plan view of a lateral half of a cultivator with my improvements applied thereto; Fig. 2, a side elevation of the same; Fig. 3, a rear enlarged and detached view of the coupling detached; Fig. 4, a transverse sectional view of the beam and a rear view of the cross-head; Fig. 5, a like sectional view of the extension portion of the cross-head; Fig. 6, a side elevation of the beam-bracket; Fig. 7, a plan view of that bracket, and Fig. 8 a plan view of the cross-head.

The letter A refers to the axle of the cultivator, being of arch form, and being supported on the usual wheels and otherwise having the usual appendages of this class of implements.

The letter B designates a cast or wrought metal sleeve fitted upon the axle between the arch portion and the usual hub-shoulder, C, and adapted to turn or oscillate freely thereon, and having one or more ribs, D.

The letter E indicates a collar of like material fitted snugly upon the sleeve B, yet capable of ready adjustment laterally thereon and fashioned interiorly to receive the ribs D, which serve to prevent the collar from turning on the sleeve. A boss, F, on the collar receives a set-screw, the function of which is to hold the collar against accidental lateral displacement from the place of adjustment for a purpose already suggested, and to more specifically hereinafter appear.

A hub, G, is formed with the collar and disposed with its bore in a vertical position to receive a coupling or king bolt for effecting a pivotal connection between the hub and the yoke of the beam. From the hub and the collar, or distinctly from either, projects, to one side or the other—in the present instance to the outer side—a stout arm, H, having a hole for connection with the alignment-rod. This device just described composes the coupling hereinbefore alluded to, and of which there are two, one at either side of the machine.

The letter I refers to the beams, of which there are also two, and J to the yokes by which they are connected to the couplings. These yokes have a metallic shank, K, substantially L-shaped in cross-section, so as to form a channel for the reception of the beam I where the beam is bolted. The yokes are also enlarged at the ends which fit, respectively, against the upper and lower ends of the hubs G, and to which they are pivotally connected by the king-bolt L, already spoken of.

It will be observed that the sleeves on the axles allow the beams to be moved in a vertical plane, as when the shovels are being lifted from out the ground, while the lateral adjustment of the collar permits the beams to be adjusted to or from each other at their forward ends to permit of their adjustment with respect to the rows.

The letter M designates the beam-brackets, which are of metal, preferably of cast metal, and have channeled shanks N, which receive and hold the beams at their rear ends, and also have rearwardly-extending portions O, to which the handles are bolted. These brackets are constructed with transverse openings P, at which part, Q, they are widened, so as to form comparatively enlarged flat surfaces for contact with the cross-heads, while the cross-heads themselves are provided with hub-like portions having enlarged ends, the result of which is to prevent the heads from twisting or working up or down at their ends and allowing the shovels to yield upward and away from their work. The parts Q of the brackets and the hub-like portions of the cross-heads are provided with holes, and a coupling-bolt is used to connect them together, leaving the head free to oscillate horizontally only in the bracket. The cross-heads R consist, besides the hub-like portions R', of the angular I-extensions S and S', having, respectively, a vertical seat, T, and a horizontal seat, U, for the shovel-standards. These seats may both be vertical or may both be horizontal, as may be desired. The extension S' has a lug, V, to which the rear end of the alignment-rod connects. It will be observed that the cross-head is of such construction that one pattern will answer for both heads, as the extension S and its seat T can be placed on the outer side of each beam by simply turning the cross-head end for end in the respective instances.

The letter W refers to the alignment-rod, whose function is that of keeping the cross-head in a parallel line with the axle, no matter whether the beam be moved more or less to either side of the direct line of the draft, the result of which is the preservation of the shovels of each cross-head in the same relative position to the axle—an advantage in practice.

It should be observed that the beam and alignment-rod here described perform practically the same function as is performed by two parallel beams pivotally connected at their forward ends with the axle and at their rear ends with a cross head or beam carrying shovel-standards. The principle, too, or mode of operation is the same in the case of the two parallel beams as in the case of the beam and the rod.

I would not have it understood that I am intending to lay a broad claim to a sleeve constructed to fit upon the axle and provided with ribs, and a collar fitted to the sleeve and having a portion to which the beam-yoke is pivoted, as this device is embodied in a patent issued to Gardner and Downey, February 15, 1881, and assigned to my assignees in this case.

Having thus fully described my invention, what I claim as new, and desire to secure by Letters Patent, is—

1. In a cultivator, the combination, with a sleeve constructed to fit upon the axle, a collar fitted to said sleeve and having integrally formed with it a vertically-disposed hub and a laterally-disposed arm.

2. In a cultivator, the cross-head having a hub-like portion enlarged at the upper and lower ends to form disk-like surfaces to prevent the twisting tendency of the head when mounted, and having lateral arms constructed to form connection with the shovel-standards and a portion to connect with the alignment-rod.

3. In a cultivator, the combination, with the beam and the beam-bracket M, having a transverse opening and laterally enlarged where the opening occurs, of a cross-head, R, having a hub-like portion, R', enlarged to agree with the bracket and pivotally mounted in said opening, and having arms to which the shovel-standards are connected.

4. In a cultivator, the beam-bracket M, consisting of a shank, N, for the beam, an enlarged portion, Q, having a transverse opening for the cross-head and another portion for the handles.

5. In a cultivator, the combination, with the axle, the coupling constructed to oscillate thereon and with a portion capable of lateral adjustability, the beam and the alignment-rod secured to said adjustable portion, of the bracket secured to the beam, having an enlarged portion and a transverse opening therein, and having a portion for the attachment of the handle, and the cross-head having a hub-like portion pivotally mounted in said opening, and arms for the attachment of the shovel-standards.

In testimony whereof I affix my signature in presence of two witnesses.

PHINEAS P. MAST.

Witnesses:
WILBER COLVIN,
EDWIN L. BRADFORD.